US008973139B2

(12) United States Patent
Wang et al.

(10) Patent No.: US 8,973,139 B2
(45) Date of Patent: Mar. 3, 2015

(54) DETECTING ALTERED APPLICATIONS USING NETWORK TRAFFIC DATA (71) Applicant: AT&T Intellectual Property I, L.P., Atlanta, GA (US)

(72) Inventors: Wei Wang, Weehawken, NJ (US); Jeffrey E Bickford, Somerset, NJ (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 234 days.

(21) Appl. No.: 13/689,506

(22) Filed: Nov. 29, 2012

(65) Prior Publication Data
US 2014/0150102 A1 May 29, 2014

(51) Int. Cl.
*H04L 29/06* (2006.01)

(52) U.S. Cl.
CPC ................... *H04L 63/1416* (2013.01)
USPC .......................................... 726/23

(58) Field of Classification Search
CPC ............ H04L 63/1416; H04L 63/1408; H04L 63/1441; H04L 63/1458; G06F 21/552
See application file for complete search history.

(56) References Cited

U.S. PATENT DOCUMENTS

| | | | | |
|---|---|---|---|---|
| 6,792,546 B1 * | 9/2004 | Shanklin et al. | ................. | 726/23 |
| 7,574,208 B2 * | 8/2009 | Hanson et al. | ............. | 455/435.1 |
| 7,644,150 B1 * | 1/2010 | Nucci et al. | .................... | 709/223 |
| 8,180,916 B1 * | 5/2012 | Nucci et al. | ................... | 709/233 |
| 8,387,139 B2 * | 2/2013 | Jarrett et al. | .................... | 726/22 |
| 8,619,614 B2 * | 12/2013 | Narayanaswamy et al. | ... | 370/252 |
| 8,676,729 B1 * | 3/2014 | Keralapura et al. | ............. | 706/12 |
| 8,788,650 B1 * | 7/2014 | Xie | ................. | 709/224 |
| 2004/0267897 A1 * | 12/2004 | Hill et al. | ...................... | 709/217 |
| 2005/0188423 A1 * | 8/2005 | Motsinger et al. | .............. | 726/22 |
| 2008/0311985 A1 * | 12/2008 | Rajani et al. | .................... | 463/31 |
| 2010/0088670 A1 * | 4/2010 | Paster | .......................... | 717/106 |
| 2012/0157106 A1 * | 6/2012 | Wang et al. | .................. | 455/446 |
| 2012/0240185 A1 * | 9/2012 | Kapoor et al. | .................... | 726/1 |
| 2012/0317306 A1 * | 12/2012 | Radinsky et al. | ............. | 709/235 |
| 2014/0150102 A1 * | 5/2014 | Wang et al. | ..................... | 726/23 |

OTHER PUBLICATIONS

D. Antoniades, M. Polychronakis, S. Antonatos, E. P. Markatos, S. Ubik, A. Oslebo. "Appmon: An Application for Accurate per Application Network Traffic Characterization," *BroadBand Europe*, Dec. 2006, pp. 1-6, Geneva, Switzerland.

(Continued)

*Primary Examiner* — Jason K. Gee
*Assistant Examiner* — Sanchit Sarker (57) ABSTRACT

A method, computer readable medium and apparatus for detecting an altered application are disclosed. Network traffic data is obtained for a number of endpoint devices to determine a network traffic signature for a first application. The signature comprises a set of flows within a time window. Network traffic data is monitored to determine a network traffic signature for a second application. The signature for the second application comprises the network traffic signature of the first application plus a flow to an additional address. The method determines a ratio of endpoint devices having network traffic data that matches the signature for the second application as compared to a percentage of endpoint devices having network traffic data that matches the signature for the first application. When the percentage satisfies a threshold, the method determines that the second application is the altered application comprising an altered version of the first application.

20 Claims, 3 Drawing Sheets (56) References Cited

OTHER PUBLICATIONS

D. Mutz, C. Kruegel, W. Robertson, G. Vigna, R. A. Kemmerer. "Reverse Engineering of Network Signatures," in *Proceedings of the Auscert Asia Pacific Information Technology Security Conference*, Gold, 2005.

W. Zhou, Y. Zhou, X. Jiang, P. Ning. "Detecting Repackaged Smartphone Applications in Third-Party Android Marketplaces," *Proceedings of the Second ACM Conference on DATA and Application Security and Privacy*, 2012, pp. 317-326, CODASPY, New York, NY.

A. Tongaonkar, R. Keralapura, A. Nucci. "Challenges in Network Application Identification," *Proceedings of the 5th USENIX Conference on Large-Scale Exploits and Emergent Threats*, 2012, pp. 1-1, USENIX, Berkeley, CA.

M. Christodorescu, S. Jha, C. Kruegel. "Mining Specifications of Malicious Behavior," *Proceedings of the 6th Joint Meeting of the European Software Engineering Conference and the ACM SIGSOFT Symposium on the Foundations of Software Engineering*, 2007, pp. 5-14, ESEC-FSE, New York, NY.

G. Myles, C. Collberg. "Detecting Software Theft via Whole Program Path Birthmarks," *Information Security*, Sep. 2004, pp. 404-415, vol. 3225, Palo Alto, CA.

J. Zhang, Y. Xiang, Y. Wang, W. Zhou, Y. Xiang, Y. Guan. "Network Traffic Classification Using Correlation Information," *IEEE Trans. On Parallel and Distributed Systems*, Jan. 2013, pp. 104-117, vol. 24, No. 1.

M. Claypool, R. Kinicki, C. Wills. "Treatment-Based Traffic Signatures," *IMRG Workshop on Application Classification and Identification (WACI)*, Oct. 2007, Cambridge, MA.

\* cited by examiner

DETECTING ALTERED APPLICATIONS USING NETWORK TRAFFIC DATA

The present disclosure relates generally to communication networks and, more particularly, to a method, computer readable medium and apparatus for detecting altered applications using network traffic data.

BACKGROUND

With a significant growing number of smart phones and applications, malware writers frequently download popular applications and repackage them with malware. These "repackaged" applications are then made available online and/or in applications stores. Such repackaged applications may be detected based on binary analysis. However, such computational intensive detection technique requires access to the binary data of the original application as well as that of the suspected repackaged application. However, this solution does not scale well, considering the thousands of applications that are available, and there is no way to tell which devices are infected by such malware without access to the codes running on each device.

SUMMARY

In one embodiment, the present disclosure discloses a method, a computer-readable medium and an apparatus for detecting an altered application. For example, the method obtains network traffic data for a number of endpoint devices to determine a network traffic signature for a first application. The network traffic signature for the first application comprises a set of flows within a time window. The method then monitors the network traffic data to determine a network traffic signature for a second application. The network traffic signature for the second application comprises the network traffic signature of the first application plus a flow to an additional address that is not included in the set of flows of the network traffic signature of the first application. Thereafter, the method determines a ratio of endpoint devices having network traffic data that matches the network traffic signature for the second application as compared to a percentage of endpoint devices having network traffic data that matches the network traffic signature for the first application. When the percentage satisfies a threshold, the method determines that that the second application is the altered application comprising an altered version of the first application.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method, a computer-readable medium and an apparatus for detecting an altered application using network traffic data. Although the present disclosure is discussed below in the context of a cellular network architecture, the present disclosure is not so limited. Namely, the present disclosure can be applied to other types of networks, such as a local area network (LAN) or wireless local area network (WLAN), an Internet Protocol network, such as an Internet Protocol/Multi-Protocol Label Switching (IP/MPLS) core network, an IP Multimedia Subsystem (IMS) network, the Internet in general, and so forth.

Figure 1:
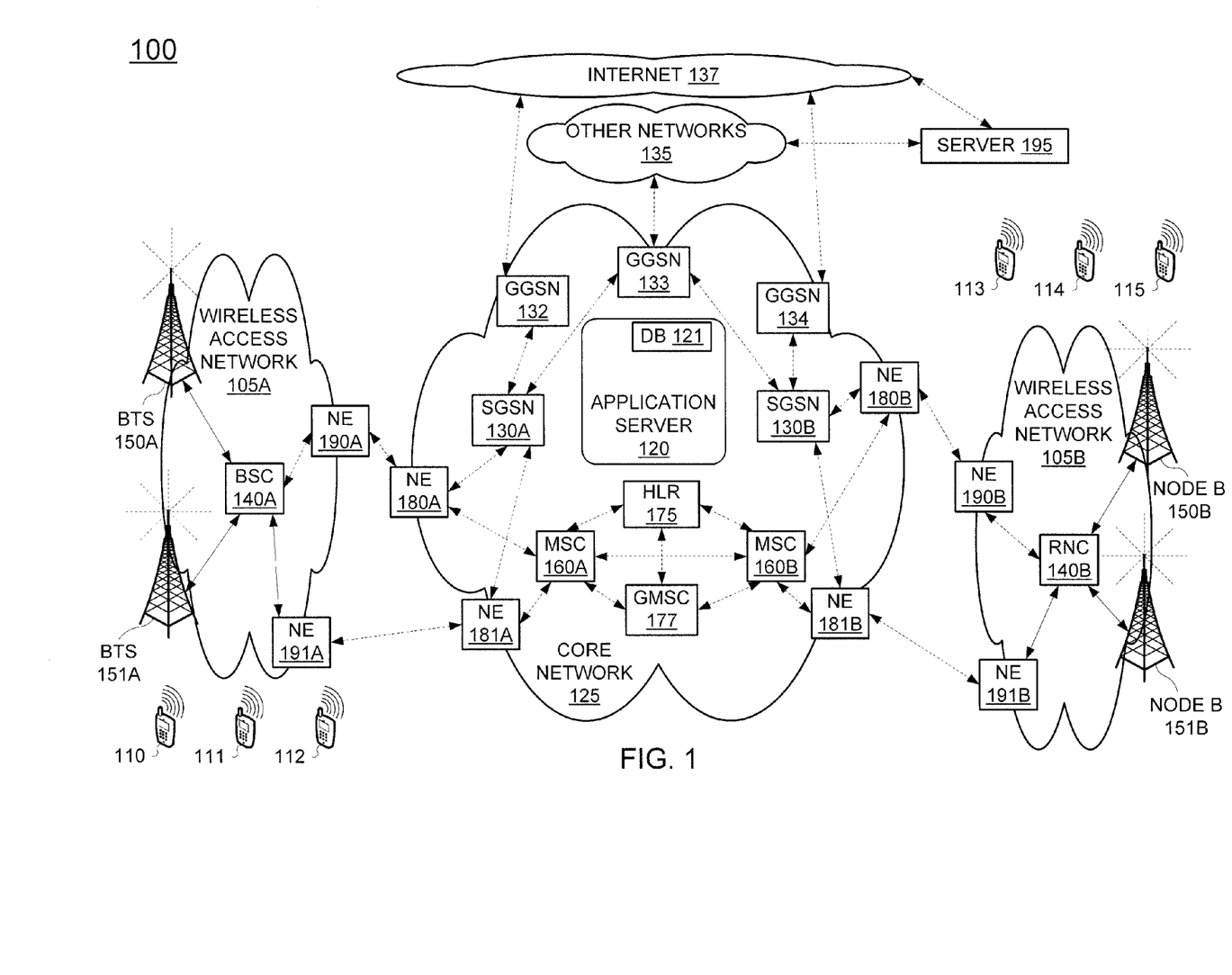
FIG. 1 illustrates an exemplary system related to the present disclosure.

To better understand the present disclosure, FIG. 1 illustrates an example system, or network 100 (e.g., a network having an integrated cellular network architecture), related to the present disclosure. In particular, network 100 includes exemplary wireless access networks 105A and 105B, and a core network 125 (e.g., a public land mobile network (PLMN)-General Packet Radio Service (GPRS) core network), suitable for implementing embodiments of the present disclosure for detecting an altered application using network traffic data. In one embodiment, the core network 125 operates on top of a multi-protocol label switching (MPLS) backbone network. Wireless access network 105A may comprise a radio access network implementing such technologies as: Global System for Mobile communication (GSM), e.g., a base station subsystem (BSS), or IS-95, among others. In other words, wireless access network 105A may comprise a network in accordance with any "second generation" (2G) network technology. In the illustrative embodiment, wireless access network 105A is shown as a GSM radio access network.

In addition, wireless access network 105B may comprise substantially similar components and functions to those found in wireless access network 105A. However, wireless access network 105B may comprise a Universal Mobile Telecommunications System (UMTS) network employing Wideband Code Division Multiple Access (WCDMA), or a CDMA2000 network, among others. In other words, wireless access network 105B may comprise a network in accordance with any "third generation" (3G), "fourth generation" (4G) or any other yet to be developed future wireless/cellular network technology. In the illustrative embodiment, wireless access network 105B is shown as a UMTS Terrestrial Radio Access Network (UTRAN) subsystem. Thus, the present disclosure is not limited to any particular type of wireless access network.

In one embodiment, each of the wireless access networks 105A and 105B is connected to the core network 125 to provide an integrated cellular network architecture (e.g., a cellular network architecture that includes multi-generational protocols and technologies). In the illustrative embodiment, network architecture 100 integrates both 2G and 3G wireless access technologies into one system. In particular, in the illustrative embodiment, core network 125 comprises a GPRS core network that provides packet-switching based core network support for both 2G and 3G wireless access networks (e.g., wireless access networks 105A and 105B, respectively).

Referring to wireless access network 105A, the access network is configured to facilitate communications between users, such as the users of wireless endpoint devices 110-112, and/or users of wireless endpoint devices 113, 114, and 115 of another wireless access network, such as wireless access network 105B. It should be noted that the communications can also be one-way, such as retrieving a news page over the Internet 137. In fact, the communications may be facilitated with other networks 135 which may comprise any packet switched or circuit switched networks, e.g., public land mobile networks (PLMNs), Voice over Internet Protocol (VoIP) networks, Service over Internet Protocol (SoIP) networks, Asynchronous Transfer Mode (ATM) networks, Frame Relay networks, a local area network (LAN), a wireless LAN (WLAN), a Metropolitan Area Network (MAN), an enterprise network and the like. For example, communications may be facilitated with a server 195 (e.g., a web server, an enterprise server, a personal computer and the like) via network 135 and/or the Internet 137.

In one embodiment, the wireless endpoint devices 110-115 may comprise any customer endpoint devices configured for wireless communication such as personal computers, laptop computers, Personal Digital Assistants (PDAs), mobile phones, smart phones, email devices, messaging devices, tablets and the like. In one embodiment, the physical links between wireless endpoint devices 110-112 and the wireless access network 105A comprise radio frequency (RF) signals between the one or more base stations 150A-151A (e.g., base transceiver stations (BTSs)) and the wireless endpoint devices 110-112. Here only two base stations 150A and 151A are depicted as part of wireless access network 105A. However, it should be appreciated that the wireless access network 105A may comprise more or less base stations depending upon the size and needs of the network.

To manage the communications of multiple users serviced by the wireless access network 105A, the wireless access network 105A may comprise one or more network elements. For example, wireless access network 105A may comprise one or more base station controllers (BSCs) 140A for managing RF communication of the base stations 150A-151A. Although only one BSC 140A is depicted in wireless access network 105A, it should be understood that various similar configurations are possible. For example, each base station 150A-151A could be serviced by its own BSC. Alternatively, BSC 140A could control a plurality of base stations. Each of the base stations 150A and 151A may communicate with BSC 140A via an A-bis interface. In addition, in a network with multiple base station controllers, the base station controllers may communicate with one another over an IuR-G interface. BSC 140A performs a variety of wireless network management related tasks such as wireless channel assignments, determining transmission power levels, controlling handovers from one base station to another base station, concentrating multiple signals from wireless endpoint devices for onward transmission to other portions of the wireless access network 105A, other networks 135 or the Internet 137, and to perform other functions.

In some embodiments, the BSC 140A may provide transcoding functions between wireless communication formats used by the base stations 150A-151A and wireless endpoint devices 110-112 and Internet Protocol (IP) formats used by wireless access network 105A and other networks 135, e.g., one or more external networks, which may comprise a PLMN operated by a different network provider. For example, the BSC 140A may forward communications to additional networks via network elements (NEs) 190A or 191A, which may comprise gateways or border elements providing, e.g., connectivity between the wireless access network 105A, core network 125, the Internet 137, and one or more other networks 135.

Each of the base stations 150A-151A comprises, at a minimum, a RF transceiver, and is configured to receive and transmit RF signals to and from wireless endpoint devices and to communicate with other elements within the wireless access network 105A and core network 125 (e.g., mobile switching center (MSC) 160A, application server 120, etc.). Base stations 150A-151A may support calls for a plurality of users with wireless endpoint devices 110-112.

As mentioned above, wireless access network 105B (e.g., a UMTS UTRAN radio access network) may comprise substantially similar components with substantially similar functions to those described in connection with wireless access network 105A (e.g., a GSM radio access network). For example, base stations 150B-151B (referred to as NodeBs in UMTS-UTRAN terminology) may functional in substantially the same manner as base stations 150A-151A (referred to as BTSs in GSM 2G terminology). In addition, Radio Network Controller (RNC) 140B (e.g., a 3G UMTS RNC) may provide substantially similar functionality to that of a 2G GSM base station controller (BSC), such as BSC 140A in wireless access network 105A. Furthermore, network elements (NEs) 190B and 191B may function in substantially the same manner as NEs 190A and 191A, respectively. Although only three wireless endpoint devices are depicted in communication with each of the wireless access networks 105A and 105B respectively, it should be understood that base stations 150A-151A and 150B-151B may support any number of users/wireless endpoint devices. For example, a customary 3G base station transceiver using W-CDMA may be capable of supporting several hundred simultaneous calls on each 5 MHz frequency band/spectrum slice.

Each of wireless access network 105A and 105B may interface with a core network 125 portion of network architecture 100, e.g., via network elements 190A-191A and 190B-191B, respectively. Although only four connections between each of the wireless access networks 105A and 105B and the core network 125 are shown, it should be understood that an arbitrary number of connections between each of the wireless access networks and the core network may exist. For example, network element (NE) 190A may interface with any number of serving GPRS support nodes (SGSNs) in the core network 125. Alternatively, or in addition, additional network elements within wireless access network 105A may provide connections between wireless access network 105A and core network 125 via one or more SGSNs in core network 125. NE 190A may facilitate communication between BSC 140A in wireless access network 105A and SGSN 121 in core network 125 via a Gb interface to route data calls. In addition, NE 190A may facilitate communication between BSC 140A and mobile switching center (MSC) 160A via core network NE 180A over an A-interface for voice calls. In addition, NEs 191A, 190B and 191B may share the same or substantially similar functionality to NE 190A with respect to voice and data calls as described herein.

In one embodiment, core network 125 includes components of a public land mobile network (PLMN) to support voice calls from and among users/mobile endpoint devices. For example, core network 125 may include one or more mobile switching centers (MSCs) for each wireless access network that forms part of the network architecture 100. For example, MSC 160A may be designated to serve and administer wireless access network 105A. Similarly, MSC 160B may be designated to serve wireless access network 105B. The MSC 160A may maintain user profile records for wireless endpoint devices currently serviced by base stations within the portion of the network that is the responsibility of MSC 160A (e.g., wireless endpoint devices 110, 111 and 112). The MSC 160A may also function as a media gateway and/or media gateway controller for facilitating communication between the wireless access network 105A and the core network 125. Thus, the MSC 160A may be responsible for connecting calls from users of mobile endpoint devices 110-112 to other wireless users or to users or devices (e.g., a server 195) on other networks 135. BSC 140A may communicate with the MSC 160A via an A-interface for routing voice calls (e.g., via NEs 190A and/or 191A and NEs 180A and/or 181A). Furthermore, BSC 140A may communicate with serving GPRS support node (SGSN) 130A using a Gb interface. The transmission protocol of the Gb interface may be based on a packet protocol, e.g., an Internet Protocol or a frame relay protocol. It should be noted that some of the functions described herein with respect to the BSC 140A may be performed by the MSC 160A, and vice versa. Those skilled in the art will appreciate that other different network configurations are possible.

In one embodiment, voice calls are forwarded from the wireless access networks to mobile switching centers (MSCs 160A and 160B) that are in communication with a Gateway Mobile Switching Center (GMSC) 177. When a MSC receives a new incoming call setup request, the MSC may forward the call to the GMSC for processing. In particular, when GMSC 177 receives a voice call from a mobile device (e.g., one of wireless endpoint devices 110, 111, or 112), the GMSC 177 determines which MSC bears responsibility for an area being visited by the called party. The voice call is then forwarded to the MSC being visited by the called party. The core network 125 may further include a home location register (HLR) 175 which functions as a central repository of authentication and service validation information, subscription information, and other information pertaining to user subscriptions and services. Similarly, respective Visiting Location Registers (VLRs) (not shown) may be located in each of the wireless access networks 105A and 105B, which function as temporary repositories of authentication and service validation information, subscription information, and other information pertaining to visiting user subscriptions and services.

For example, HLR 175 may comprise a centralized repository serving a wireless/cellular network service provider's entire network. On the other hand, a VLR may be a localized component that temporarily stores a user's subscriber information when the user's wireless endpoint device is located in a particular geographic region serviced by a particular VLR. In addition, HLRs and/or VLRs may provide the subscriber information to the relevant MSC, BSC, or GMSC to support the functionalities of the MSC, BSC, or GMSC as described above.

With respect to core network 125, components servicing data calls/data applications may include serving GPRS support nodes (SGSNs), gateway GPRS support nodes (GGSNs), and related support components including media servers, application servers, and the like. A serving GPRS support node (SGSN) refers to a network node responsible for communicating with user endpoint devices and routing of data calls. For example, a SGSN may send and receive data packets to and from user endpoint devices in the coverage area of the SGSN. In the example of FIG. 1, core network 125 includes two SGSNs 130A and 130B which serve endpoint devices using wireless access networks 105A and 105B, respectively.

A gateway GPRS support node (GGSN) refers to a network node responsible for the interworking between a GPRS network (e.g., components of core network 125 that support GPRS services and functionality) and external packet switched networks, e.g., the internet or other networks. For example, GGSNs 132-134 in FIG. 1 convert GPRS data packets coming from the SGSNs 130A and 130B into the packet data protocol (PDP) format of an external packet network. For example, the GPRS packet may be converted to an internet protocol packet prior to being sent to an external network that is internet protocol based. Thus, the GGSN and SGSN components of the GPRS core network 125 support data call functionality between wireless endpoint devices and entities external to the integrated cellular network architecture 100.

In general, in a $3^{rd}$ generation partnership project (3GPP) network, the setup of a data call may be summarized as follows. A wireless endpoint device requests connectivity to an external network or service by providing a corresponding Access Point Name (APN) to the GRPS cellular network architecture. During the PDP Context activation phase for a mobile device (e.g., a cellular device, such as any of wireless endpoint devices 110-115), the SGSN serving the mobile cellular device performs a DNS lookup to determine which GGSN(s) are configured for serving the requested APN for the mobile cellular device. The APN for a large external network may be mapped to a number of GGSNs, while a small external network may only be mapped to a single GGSN. GGSN mapping can also be based on load or mobile cellular device location during this process to improve data service quality. The identities of the mapped GGSN or GGSNs are then returned to the SGSN and the SGSN selects one to create a new PDP Context for the mobile device. In the case of IP network access, at the end of the PDP Context activation process, the mobile device also receives its IP address.

The core network 125 may also include, in one embodiment, an application server (AS) 120. The application server 120 may include a database (DB) 121. In one embodiment, DB 121 stores network traffic data records as well as application network traffic signatures for a number of applications that may be used by endpoint devices 110-115, as will be described in greater detail below. The application server 120 may be configured to provide one or more functions for supporting voice and data calls or flows, and for collecting and using information derived from such flows. For example, application server 120 may comprise any server or computer that is well known in the art, and the database 121 may be any type of electronic collection of data that is also well known in the art. In addition, the application server 120 may be connected directly or indirectly to any one or more network elements of the network 100 configured to gather and forward network traffic data and other information and statistics to the application server. Due to the relatively large number of connections available between the application server 120 and other network elements, none of the actual links to the application server are shown in FIG. 1.

In one embodiment, the application server 120 may periodically query network elements to provide current or past network traffic data to be stored in database (DB) 121 and/or to be processed by the application server. Alternatively, any one or more of the network elements in wireless access networks 105A and 105B and/or core network 125 may be configured to automatically transmit relevant data to the application server 120. In still another embodiment, a network provider may deploy a billing and traffic server (not shown) for collecting network traffic data, e.g., call detail records. For example, the billing and traffic server is capable of tracking a large number of call parameters, or features, such as and not limited to: the number of calls, the duration of calls, the calling party numbers, the called party numbers, the types of call, and so on. In the context of the present disclosure a "call" is broadly considered to be any voice or data call (e.g., including short message service (SMS) messages) traversing the network, and includes calls originating and/or terminating in cellular access networks. In addition, the terms "call" and "flow" are used interchangeably herein. For example, a data call may comprise a flow of one or more packets between a source and a destination.

In any case, these call features are processed and accounted by the billing and traffic server so that proper bills are generated and provided to the customers of the service provider. Thus, in one embodiment application server 120 may obtain all or a portion of the necessary network traffic data from records already collected by such a billing and traffic server. Regardless of the manner in which the application server 120 receives and/or obtains relevant data, e.g., network traffic data, from the providing network elements, the data may be stored in database 121 for concurrent or later use in determining application network traffic signatures, as will be described in greater detail below.

The foregoing description of an integrated cellular network architecture 100 is provided as an illustrative example only. In other words, the embodiment of network 100 is merely illustrative of one network configuration that is suitable for implementing embodiments of the present disclosure. Thus, in one embodiment network 100 includes a GPRS core network integrated with a GSM wireless access network 105A and a UTRAN wireless access network 105B. However, the present disclosure may also include any other different network configurations that are suitable for implementing embodiments for detecting an altered application using network traffic data. For example, one or more of the wireless access networks 105A and 105B and/or core network 125 could include components in accordance with GSM evolution (EDGE) networks, Long Term Evolution (LTE) networks, and so on.

In addition, as mentioned above, the present disclosure is not limited to a cellular/wireless network environment, but is broadly applicable to other types of communication networks for conveying communications between endpoint devices. For example, the Core Network 125 may comprise an IP multimedia subsystem (IMS) network, or any other network for conveying communications among endpoint devices and between endpoint devices and other components (e.g., core network and access network components). Similarly, in various other embodiments, any one or more of wireless/cellular access networks 105A and 105B may comprise a different type of access network such as a wireless local area network (WLAN), an IEEE 802.11 network, a "wired" access network, e.g., a local area network (LAN), an enterprise network, a metropolitan area network (MAN), a digital subscriber line (DSL) network, a cable network, and so forth. In one embodiment, the present disclosure may involve a hybrid network comprising cellular and non-cellular network portions, wired and wireless network portions, etc. As such, any one or more of endpoint devices 110-115 may comprise a non-cellular device such as a personal computer, a laptop computer, a Wi-Fi device, a server (e.g., a web server), and so forth, or may have both cellular and non-cellular access capabilities. In any case, for illustrative purposes the present disclosure is described in greater below in connection with the architecture of network 100.

Furthermore, although certain components are depicted as residing within a particular portion of the network 100, it should be understood that certain components may be located in other portions of the network 100. For example, network components, such as application server 120 and mobile switching centers 160A and 160B, may be included in respective wireless access network portions (e.g., wireless access networks 105A and 105B) instead of being deployed within the core network 125, while providing essentially the same functionality. For instance, in one embodiment, all or a portion of the functions of application server 120 may be implemented in a server connected to the Internet 137 or residing in a different network, such as network 135 (e.g., a $3^{rd}$ party network).

In addition, other logical and/or physical arrangements for deploying network architecture 100 may be implemented in accordance with the present disclosure. Thus, for example, MSC 160A may actually reside within a Public Land Mobile Network (PLMN) portion of the network architecture 100 that may reside within, overlap with, and/or interface with a packet-switched portion of the network architecture 100, e.g., GPRS core network 125. For example, a PLMN portion of network architecture 100 may include such components as MSC 160A, MSC 160B, network element (NE) 180A, NE 180B, NE 181A, NE 181B, home location register (HLR) 175, gateway mobile switching center (GMSC) 177, application server (AS) 120, and other components (not shown). Additional details and variations of this nature are omitted for simplicity and to improve clarity of understanding with respect to the claimed embodiments. Thus, for the purposes of the following discussion, it is assumed that the described embodiments are implemented within the exemplary embodiment of network 100 depicted in FIG. 1.

Embodiments of the present disclosure detect altered applications (e.g., repackaged applications) using network traffic data. Exemplary application types include voice call applications, voice mail applications, text messaging applications, data call applications, short message service (SMS) applications, email applications, web browsing applications, streaming video applications, instant messaging applications, social networking applications, and the like. There may be several hundred thousand different applications available for just a single device or operating system platform. For example, some mobile devices may access an "application store" to obtain, purchase and/or download new applications, to find updates to existing applications, etc. Within the application store there may be a substantial number of free and paid applications. However, it has been found that within just one application marketplace, a significant percentage of applications may be repackaged applications and likely offered by someone other than the original developer. These repackaged applications may be detected by binary analysis, e.g., by comparing the code from an application to the suspected repackaged application. Repackaged applications may also be detected by looking for "birth marking" within the application codes, e.g., codes that serve no functional purpose other than to identify the authorship of the codes to its creator. Of course such techniques require access to the suspect application codes and/or to the codes of the original application. The first approach is also a computationally expensive exercise.

In addition, only an application store owner can remove applications uploaded to its store and may or may not be able to identify users who have downloaded a potentially malicious application. Furthermore, unless implemented by the application store owner, this approach requires crawling application stores and downloading numerous applications, which may be against the application store's terms of service. In contrast to the foregoing, embodiments of the present disclosure do not require access to application codes and do not require any knowledge of the name, function or purpose of the application. Instead, altered applications are detected through the use of network traffic signatures determined via an aggregation of network traffic data.

In one embodiment, the network traffic data may comprise a number of records, each record comprising a summary report of activity during one particular flow, data session and/or voice session by one endpoint device. In one embodiment, the network traffic data records are collected from an operator's core network (e.g., core network 125 in FIG. 1). In one embodiment, the network traffic data records comprise call detail records (CDRs). Broadly, a CDR is a record produced by a network element containing details of a call (including voice calls, data calls, e.g., IP traffic, SMS messaging calls, and so forth) that passed through it. CDR records and cause codes conform to an industry standard format. For example, each CDR comprises numerous fields containing different information or parameters. To name only a few parameters for illustration, CDR parameters may comprise a cause code, a calling party area code, a calling party phone number, a called party area code, a called party phone number, a date of the call, a time stamp for the start of a call, a time stamp for the end of a call, a time duration of a call, a type of call, a disposition of a call, a direction of a call, a cell identifier which identifiers the cell that serves the device (e.g., the serving base station), a trunk group used by a call, a gateway used by a call, a node traversed by a call, IP addresses of a source and one or more destinations, other types of addresses for a source and destination(s) of a call, flow or session, such as a Session Initiation Protocol (SIP) uniform resource locator (URL), a uniform resource identifier (URI) and the like, an international mobile equipment identify (IMEI) number and/or a mobile equipment identifier (MEID), a type allocation code (TAC) (which may also be contained within the IMEI/MEID), a data volume of a call, and so on. It should be noted the above list is not exhaustive and is not representative of all parameters that are currently provided in a network traffic data record.

In addition, any and all network elements, including devices/network elements in the access network may generate network traffic data records in association with a particular call/flow. In the context of the present disclosure, CDRs, or more broadly network traffic data records, may be collected from any and all such network elements, or selected network elements involved in processing one or more calls traversing the network 100. For example, network traffic data may be received from border elements or other devices that are deployed within the access networks 105A and 105B of FIG. 1. For example, the service provider of the core network may also be the same service provider for the access networks. Alternatively, the service providers of the core network and the access networks may simply have an agreement to share network traffic data between the two service providers.

In one embodiment, the network traffic data comprises current network traffic data observed in the relevant network. For example, raw network traffic data may be obtained and/or collected by monitoring devices of core network 125 or wireless access networks 105A and 105B configured to monitor network traffic. In one embodiment, the network traffic analyzed includes signaling message flows as well as media flows. For example, BSCs 140A and 140B, NEs 190A and 180B, SGSNs 130A and 130B, MSC 160A and any other component of network 100 may be configured to monitor network traffic and create/store raw network traffic data derived from the underlying network traffic. In one embodiment, the network traffic data pertains to data calls/data flows. Thus, the raw network traffic data may be gathered by GPRS components of network 100 including but not limited to SGSNs 130A-130B, GGSNs 132-134, and other network elements supporting data calls such as BSC 140A, RNC 140B, and the like. In another embodiment, the network traffic data pertains to voice calls/flows. Thus, the network traffic data may be gathered by PLMN components of network 100 including but not limited to MSCs 160A-160B, BSC 140A, RNC 140B, GMSC 177 and other network elements supporting voice calls. In still another embodiment, network traffic data for both voice and data flows are gathered and analyzed together, e.g., by application server 120 as discussed in method 200 below.

In one embodiment, the monitoring devices may store the raw network traffic data locally. Alternatively, the monitoring devices may create aggregated network traffic data records based upon underlying network traffic observed. For example, in one embodiment, application server 120 queries one or more of the component devices collecting network traffic data periodically to obtain the collected raw network data or aggregated network traffic data records (i.e., the current network traffic data). In another embodiment, the application server 120 obtains the raw network traffic data or aggregated records automatically. For example, the component devices may send the raw network traffic data and/or summary records periodically without being prompted.

Figure 2:
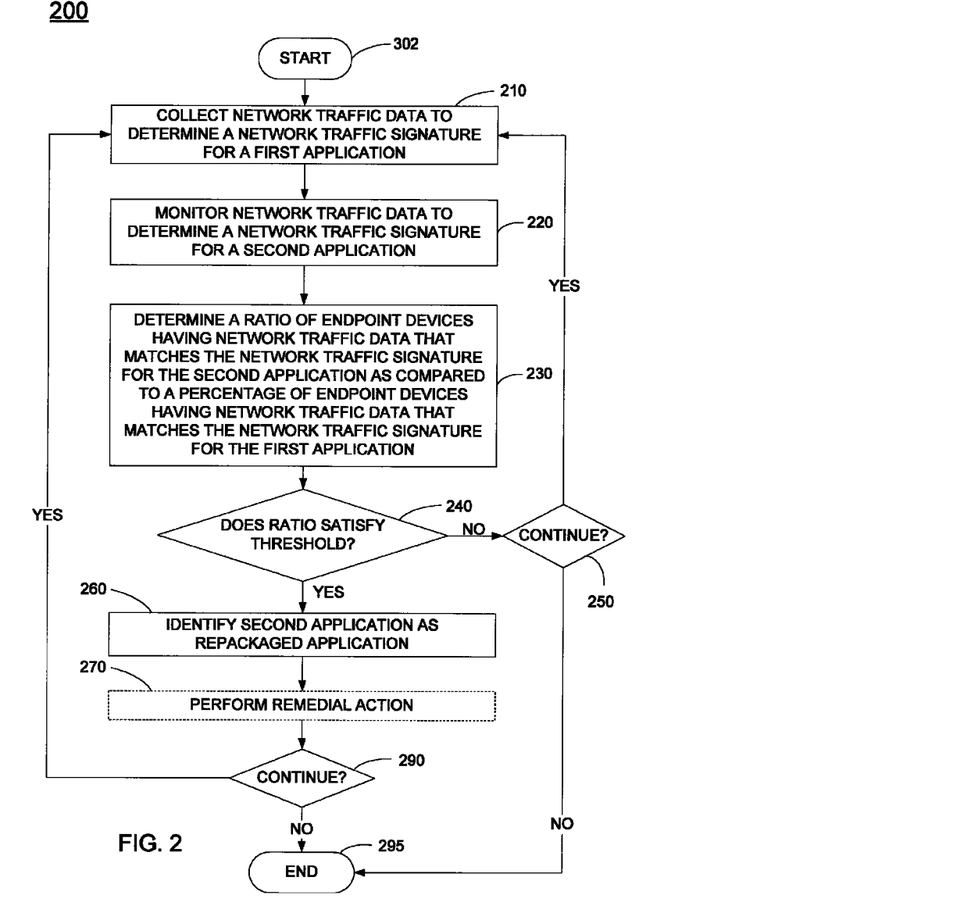
FIG. 2 illustrates a flowchart of a method for detecting an altered application using network traffic data according to the present disclosure.

FIG. 2 illustrates a flowchart of a method 200 for detecting an altered application using network traffic data. The steps or operations of the method 200 may be performed by any one or more of the components of the network 100 depicted in FIG. 1. For example, in one embodiment, the method 200 is performed by Application Server 120 in FIG. 1. Alternatively, or in addition, the steps or operations of the method 200 may be implemented by a general purpose computer as illustrated below in FIG. 3, specifically programmed to perform the steps, functions and/or operations of the method. Although any one of the elements in core network 125, wireless access network 105A and/or wireless access network 105B, may be configured to perform various steps of the method 200, the method will now be described in terms of an embodiment where the method is performed at the application server 120 in FIG. 1.

The method 200 begins in step 202 and proceeds to step 210. At step 210, the method 200 collects network traffic data for a plurality of endpoint devices to determine a network traffic signature for a first application. For example, in one embodiment the method monitors traffic flows for a number of endpoint devices 110-115 in FIG. 1. For instance, network traffic data may be obtained from a number of network elements (e.g., from network elements, SGSNs, GGSNs, call session control function servers, media servers, and so forth) for each call, session or flow, to and/or from each endpoint device. Broadly, a call, or flow, may comprise any voice or data call traversing a network. Thus, a call detail record may pertain to network traffic data for a flow of a voice call, a data call, a multimedia call, and so forth without regard to the underlying type of communication. In one embodiment, a flow comprises any one or more packets from a source address (e.g., a source endpoint device) to a destination address (e.g., a destination endpoint device). For example, a flow may comprise one or more packets communicated between endpoint device 110 (e.g., a smart phone) and server 195 in FIG. 1. In addition, a flow may be associated with signaling or media paths supporting both voice and data calls. In one embodiment, network traffic data is associated with at least one endpoint device (e.g., an endpoint device initiating the call/flow, or the one or more endpoint devices receiving the call). For example, an address or other identifier of the at least one endpoint device may indicate that the endpoint device is a source or destination of a flow in a network traffic data record.

Also at step 210, the method 200 determines at least one network traffic signature for at least one application (e.g., a first application). For instance, the network traffic data may identify several calls or flows set up within a short duration of time by the same endpoint device. For example, a user of an endpoint device may invoke an application running on the endpoint device, such as a social media application associated with a social media network. Furthermore, the social media application may make invoke several flows as the application is started or as the application continues to operate. For example, as the application is started, the application may create a session with a server of the social media network. This session may create one or more flows to and from the server, e.g., for a login process. Similarly, at the initiation of the application or after the user presents login credentials to the server, one or more additional flows may be created to a number of ancillary destinations. For example, the endpoint device of the user may be redirected to a different server for providing further services of the social media network to the user. For example, the social media application may present an interface on the endpoint device populated with content obtained from the flow with the different server to which the endpoint device is redirected. A number of additional flows may also be set up with a number of other destinations such as one or more servers or other devices of one or more analytics service providers, partner application providers (e.g., news feed services, blog service providers, email providers, etc.), and the like. Thus, several flows to and from the endpoint device may be invoked by the application simultaneously or within a very short duration of time. Accordingly, at step 210, the method may identify such flows through one or more network traffic data records and associate in time one or more flows to identify a network traffic signature for an application.

A network traffic signature for an application may comprise a set of flows which are invoked within a particular duration of time (e.g., within a one second time period, a five second time period, etc.). For example, a network traffic signature may be defined as $S=\{1, 2, 3, 4 \ldots N|T\}$ where S comprises the signature, each numeral corresponds to a flow and T is a particular duration of time. For example, one signature may include flows/calls to the following domains in the following order: $S=\{\text{"abc.att.net"}, \text{"xyz.adnetwork.com"}, \text{"def.rssnewsfeed.com"}|30 \text{ seconds}\}$. In one embodiment, the method 200 does not identify a network traffic signature for an application unless the same set of flows is observed in the network traffic data multiple times. For example, the same set of flows within a short duration may be a recurring pattern in the network traffic data for at least one endpoint device. In particular, a user of an endpoint device may invoke the same application on a regular basis, such as twice a day for at least five days each week over several weeks. Similarly, different users with multiple different endpoint devices may be using the same application. As such, the same pattern or set of flows that are closely related in time may appear in the network traffic data of the multiple different endpoint devices. Thus, in one embodiment at step 210, the method 200 determines a network traffic signature for a first application if the same pattern of flows is observed for a threshold number of times within a particular time period. For instance, if the same pattern of flows is observed at least X times within Y hours, then the pattern is assigned as a signature for an application (e.g., a first application). The number of occurrences may be observed in the network traffic data for as few as a single endpoint device or in the network traffic data for a much larger number of endpoint devices (e.g., all or a large portion of endpoint devices of registered subscribers of a network service provider).

For example, in one embodiment, a network traffic signature is not identified for an application unless the same pattern of flows appears in the network traffic data for a threshold number of endpoint devices. In one embodiment, the threshold number of endpoint devices is an additional requirement further to the requirement that the same pattern appear in all of the network traffic data a threshold number of times within a time window.

Notably, despite identifying a signature for an application, it is not necessary for the method to be aware of any other details regarding the actual application, e.g., its name, its purpose, subject matter, and the like. Thus, the pattern, or signature, may be assigned an identifier such as "application 1", "application 2" . . . "application n" and so forth.

In one embodiment, the method 200 considers network traffic data records associated with a particular geographic constraint. For example, the method may look only at network traffic data pertaining to endpoints located in a particular country, state, or other region (e.g., based on source and destination address(es) in the records). For instance, some applications may generate flows to different servers depending upon where the endpoint device running the application is located. For example, many content providers use mirror sites to provide faster services. Similarly, applications may communicate with local advertising servers to deliver more relevant advertising content depending upon the endpoint device location. Thus, the same application may generate different flows (and therefore appear to have a different signature) depending upon where the application is being used. Likewise, the same application may generate different flows depending upon the mode of access (e.g., using a cellular network connection to place a call versus a Wi-Fi connection to place the same call (e.g., using voice over internet protocol (VoIP) infrastructure)). Thus, in one embodiment, network traffic data for flows traversing cellular access networks may be considered separately from network traffic data for flows over another type of access network for determining one or more application signatures. Further, the same application may appear to have a different signature depending upon the time of day or day of the week, for instance. For example, an application may generate one or more flows to a server at a particular location during daytime hours (e.g., a call center staffed with live representatives), but may generate one or more flows to a different server (e.g., to a call center in a different country) when it is outside of working hours at the primary call center. As such, in one embodiment, the method 200 considers a time-of-day appropriate signature for an application when comparing it to a signature for a potential repackaged application. For instance, a network traffic data signature may be determined for an application that is associated with a particular time of day (e.g., between 10:00 AM and 11:00 AM). For example, the signature may be derived from network traffic data for calls/flows between 10:00 AM and 11:00 AM from each day in the previous week and does not look at network traffic data records from other times of the day.

At step 220, the method 200 monitors the network traffic data to determine a network traffic signature for at least a second application. For example, step 220 may involve the same process described above in connection with step 210. For example, step 210 may identify a signature for a first application $S1=\{1, 2, 3, 4, 5, 6, 7, 8, 9, 10|T\}$ while step 220 may identify or determine a signature for a second application $S2=\{11, 12, 13, 14, 15, 16, 17, 18, 19, 20, 21, 22, 23|T\}$. Notably, in one embodiment the signature for the second application may overlap with all or a portion of the signature for the first application. For example, the first application may comprise a freeware version of an antivirus software while the second application may comprise a premium version of antivirus software created by the same company. As such, there may be a substantial overlap between S1 and S2 for the freeware software and the premium version. For instance S1 may comprise S1={1, 2, 3, 4, 5, 6, 7, 8, 9, 10|T} while S2 may comprise S2={1, 2, 3, 4, 5, 6, 7, 8, 9, 10, 11, 12|T}.

On the other hand, malware writers frequently download popular applications and repackage them with malware. These repackaged applications are then made available online and/or in applications stores. Embodiments of the present disclosure observe changes from the network traffic signature of the original application to the signature of a second, altered version of the original application to detect that the second application is an altered application. For example, the signature of a first or original application may comprise S1={1, 2, 3, 4, 5, 6, 7, 8, 9, 10|T} while a signature of a second application may comprise S2={1, 2, 3, 4, 5, 6, 7, 8, 9, 10, 11|T}. Notably, the additional flow (flow 11) in the second signature may comprise, for instance, a data flow to a malware server, such as a command and control server, or an advertising server associated with the malware writer. As another example, a signature for the first application may comprise: S={"abc.att.net", "def.rssnewsfeed.com", "local.rssnewsfeed.com", "xyz.worldrssnews.com", "uvw.rsssports.com"|30 second}. On the other hand, a signature for the second application may comprise: S={"abc.att.net", "def.rssnewsfeed.com", "local.rssnewsfeed.com", "xyz.worldrssnews.com", "uvw.rsssports.com", "abc.spamnetwork.com"|30 seconds}.

While the method 200 may determine a large number of signatures for a large number of applications that are used by endpoint devices over a network, step 220 involves determining a signature for a second application, where the signature for the second application comprises the signature of the first or original application identified at step 210 plus at least one additional flow between an endpoint device to which the network traffic data pertains and at least one additional device, address and/or domain that is not in the signature for the original application.

At step 230, the method 200 determines a percentage of endpoint devices having network traffic data that matches the network traffic signature for the second application as compared to a percentage of endpoint devices having network traffic data that matches the network traffic signature for the first application. For example, as noted above, application signatures can be identified and determined from network traffic data associated with a plurality of endpoint devices. In addition, patterns of flows for each endpoint device can be identified in the network traffic data for each endpoint device. As such, in one embodiment the method 200 is also able to identify which endpoint devices are using which application. For instance, the method may determine from the network traffic data that endpoint device A is using the first application because network traffic signature S1 appears in the network traffic data for endpoint device A. Similarly, the method 200 may also determine that endpoint device B is using the second application because signature S2 appears in the network traffic data for endpoint device B. Accordingly, at step 230, the method 200 observes which applications are being used by each of a plurality of devices.

In one embodiment, the method further determines a total number of endpoint devices that are using the original/first application and a total number of devices that are using the second application. In one embodiment, the method then calculates a ratio of the number of endpoint devices using of the second application versus a number of endpoint devices using the first application (e.g., S2/S1). In one embodiment, the ratio is calculated as a percentage of endpoint devices using the second application versus a total number of endpoint devices using the first and second applications.

At step 240, the method 200 determines if the ratio satisfies a threshold. For example, in one embodiment if the ratio of S2/S1 is small, then S2 is considered to be a suspicious application. For example, if S2/S1 is less than 0.1, 0.2, 0.25, 0.3, 0.33, 0.4, 0.5 or some other threshold value, then S2 may comprise a repackaged application. If the ratio does not satisfy the threshold, then the method proceeds to step 250.

At step 250, the method 200 determines whether to continue. Notably, the steps, functions and/or operations of the method 200 may continue substantially indefinitely. For example, the method 200 may be deployed by a network operator to continuously monitor network traffic data over the network to determine network traffic signatures for applications using the network. As such, if it is determined to continue, the method proceeds back to step 210. Otherwise, the method 200 proceeds to step 295 where the method ends. If, on the other hand, the ratio is determined to satisfy the threshold at step 240, the method 200 may proceed to step 260.

At step 260, the method 200 identifies the second application as a repackaged application. For example, a repackaged application may have a network traffic signature that comprises the network traffic signature for an original application plus a flow to an additional address, device or domain. However, there are several additional circumstances that may lead to the threshold of step 240 being satisfied. For example, network traffic signatures for legitimate applications may change over time, such as where a software vendor deploys an update to a software product. As such, the method 200 may falsely identify a suspicious application if the network traffic signature of the updated software comprises the network traffic signature of the original application plus at least one additional flow. For instance, different groups of users of the software may upgrade in stages. As such, when the update is first deployed, the method may identify a signature S2 corresponding to the updated application. Further, the ratio of S2 to S1 may satisfy the threshold at step 240. As such, the method 200 may identify a false positive at step 260. Thus, in one embodiment the method 200 identifies the second application as simply a potential repackaged application.

At step 270, the method 200 performs at least one remedial action in response to a repackaged application (or a potential repackaged application) being identified at step 260. For instance, the method 200 may block, drop or redirect traffic that appears to be part of a flow for a repackaged application. In one embodiment, the method may notify a network operator that a repackaged application is being used by certain endpoint devices over the network. Similarly, the method may notify a user of an endpoint device that the endpoint device appears to be running the repackaged application. In one embodiment, the method identifies a domain, address and/or destination associated with the at least one additional flow in the signature for the repackaged application. For instance, the method may identify the domain to a network operator, to a vendor of the original application, to an anti-malware vendor, or other party to investigate. Likewise, in one embodiment, the method 200 may place the domain, address, destination and/or device on a blacklist for monitoring, blocking, quarantining or otherwise restricting network traffic involving such domain, address, destination and/or device.

In addition, as mentioned above, step 260 may involve identifying the second application as merely a potential repackaged application. Thus, several of the remedial actions at step 270 may comprise further investigation into the second application and/or the domain, address and/or destination associated with the at least one additional flow. Accordingly, at step 270, the method may determine that the second application has a legitimate purpose. For example, the second application may not in fact be a second application at all. Rather, the "second application" may simply, comprise an upgrade to the first/original application, a premium version of the first application, and the like. Thus, in one embodiment, step 270 may actually comprise placing a particular address, domain or device on a "white list" or safe list after it is determined that the destination is not malicious.

Following step 270, the method 200 proceeds to step 290 where the method determines whether to continue. Notably, the steps, functions and/or operations of the method 200 may continue substantially indefinitely. For example, the method 200 may be deployed by a network operator to continuously monitor network traffic data over the network to determine network traffic signatures for applications using the network. As such, if it is determined to continue, the method proceeds back to step 210. Thus, as the method 200 repeats steps 210-290, the method may continually update application signatures for legitimate applications by using network traffic data over a current sliding time window T. For example, when a legitimate application changes (e.g., due to a software update from the vendor), a second repackaged application may be falsely identified. However, step 270 may filter out this circumstance as a false positive. In addition, as most or all devices update to the new version of the application, the signature for the application will change to match the new application, since only network traffic data for a current sliding time window is used.

If, on the other hand, at step 290 the method 200 determines not to continue, the method proceeds to step 295 where the method ends.

In addition, although not specifically specified, one or more steps, functions or operations of the method 200 may include a storing, displaying and/or outputting step as required for a particular application. In other words, any data, records, fields, and/or intermediate results discussed in the method can be stored, displayed and/or outputted either on the device executing the method 200 or to another device, as required for a particular application.

Furthermore, steps, blocks, functions or operations in FIG. 2 that recite a determining operation or involve a decision do not necessarily require that both branches of the determining operation be practiced. In other words, one of the branches of the determining operation can be deemed as an optional step. Furthermore, steps, blocks, functions or operations of the above described method can be combined, separated, and/or performed in a different order from that described above, without departing from the example embodiments of the present disclosure.

Figure 3:
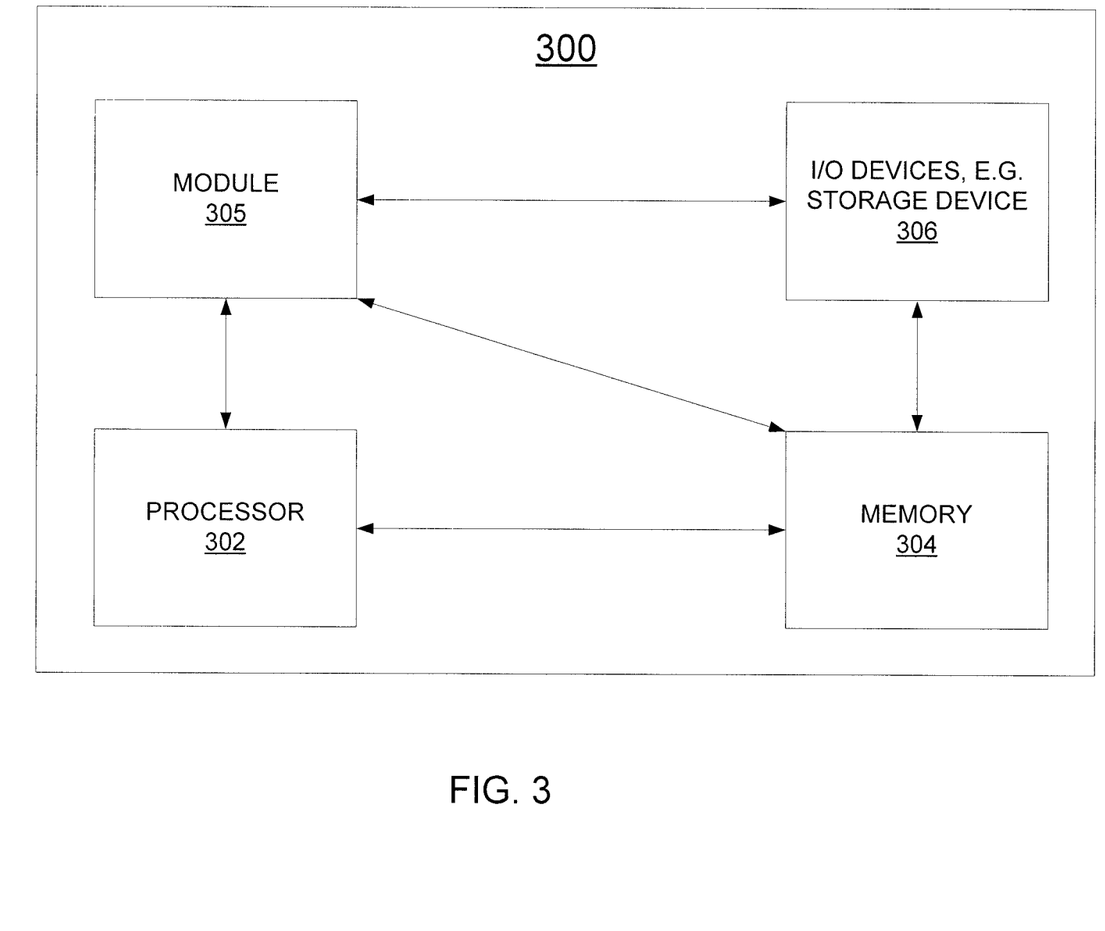
FIG. 3 illustrates a high-level block diagram of a general-purpose computer suitable for use in performing the functions, methods and algorithms described herein.

FIG. 3 depicts a high level block diagram of a general purpose computer suitable for use in performing the functions described herein. For examples, any one or more components or devices illustrated in FIG. 1 or described in connection with the method 200 may be implemented as the system 300. As depicted in FIG. 3, the system 300 comprises a hardware processor element 302 (e.g., a microprocessor, a central processing unit (CPU) and the like), a memory 304, e.g., random access memory (RAM) and/or read only memory (ROM), a module 305 for detecting an altered application, and various input/output devices 306 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that embodiments of the present disclosure can be implemented in software and/or in a combination of software and hardware, e.g., using application specific integrated circuits (ASIC), a general purpose computer or any other hardware equivalents, e.g., computer readable instructions pertaining to the method(s) discussed above can be used to configure a hardware processor to perform the steps, functions and/or operations of the above disclosed method. It should be noted that the hardware processor can be configured or programmed to cause other devices or elements of an apparatus or system to perform one or more operations as discussed above. In other words, the hardware processor may serve the function of a central controller directing other devices or elements to perform the one or more operations as discussed above.

In one embodiment, the present module or process 305 for detecting an altered application can be implemented as computer-executable instructions (e.g., a software program comprising computer-executable instructions) and loaded into memory 304 and executed by hardware processor 302 to implement the functions as discussed above in connection with the exemplary method 200. As such, the present module or process 305 for detecting an altered application as discussed above in method 200 (including associated data structures) can be stored on a non-transitory (e.g., tangible or physical) computer readable storage medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for detecting an altered application, comprising:
    obtaining, by a processor, network traffic data for a plurality of endpoint devices to determine a network traffic signature for a first application, wherein the network traffic signature for the first application comprises a set of flows within a time window;
    monitoring, by the processor, the network traffic data to determine a network traffic signature for a second application, wherein the network traffic signature for the second application comprises the network traffic signature of the first application plus a flow to an additional address that is not included in the set of flows of the network traffic signature of the first application;
    determining, by the processor, a ratio of endpoint devices having network traffic data that matches the network traffic signature for the second application as compared to a percentage of endpoint devices having network traffic data that matches the network traffic signature for the first application; and
    determining, by the processor, that the second application is the altered application comprising an altered version of the first application when the percentage satisfies a threshold.

2. The method of claim 1, wherein each of the flows in the set of flows comprises a flow between one of the plurality of endpoint devices and an address.

3. The method of claim 1, wherein the plurality of endpoint devices comprise mobile endpoint devices.

4. The method of claim 1, further comprising:
    performing a remedial action in response to determining that the second application is the altered application.

5. The method of claim 4, wherein the remedial action comprises:

notifying an endpoint device that is determined to have network traffic data matching a network traffic signature of the second application that the endpoint device is infected with the altered application.

6. The method of claim 4, wherein the remedial action comprises:
blocking new flows to the additional address.

7. The method of claim 4, wherein the remedial action comprises:
determining that the second application comprises an updated version of the first application.

8. The method of claim 7, wherein the determining that the second application comprises the updated version of the first application is based upon an observation of subsequent network traffic data.

9. The method of claim 1, wherein the network traffic data comprises a plurality of network traffic data records.

10. The method of claim 9, wherein each of the network traffic data records includes a source address and a destination address of a flow.

11. The method of claim 10, wherein one of the source address and the destination address comprises a uniform resource locator of a domain.

12. The method of claim 9, wherein the network traffic data records comprise call detail records.

13. The method of claim 1, wherein the network traffic data for each flow is collected from a plurality of network elements processing the flow.

14. The method of claim 1, wherein the additional address is associated with a server.

15. The method of claim 14, wherein the server comprises an advertising server.

16. The method of claim 14, wherein the server comprises a command and control server.

17. A non-transitory computer readable medium storing a plurality of instructions which, when executed by a processor, cause the processor to perform operations, the operations comprising:
obtaining network traffic data for a plurality of endpoint devices to determine a network traffic signature for a first application, wherein the network traffic signature for the first application comprises a set of flows within a time window;
monitoring the network traffic data to determine a network traffic signature for a second application, wherein the network traffic signature for the second application comprises the network traffic signature of the first application plus a flow to an additional address that is not included in the set of flows of the network traffic signature of the first application;
determining a ratio of endpoint devices having network traffic data that matches the network traffic signature for the second application as compared to a percentage of endpoint devices having network traffic data that matches the network traffic signature for the first application; and
determining that the second application is an altered application comprising an altered version of the first application when the percentage satisfies a threshold.

18. The non-transitory computer readable medium of claim 17, further comprising:
performing a remedial action in response to determining that the second application is the altered application.

19. The non-transitory computer readable medium of claim 17, wherein the remedial action comprises:
notifying an endpoint device that is determined to have network traffic data matching a network traffic signature of the second application that it is infected with the altered application.

20. An apparatus for detecting an altered application, the apparatus comprising:
a processor; and
a non-transitory computer-readable medium in communication with the processor, storing a plurality of instructions which, when executed by the processor, cause the processor to perform operations, the operations comprising:
obtaining network traffic data for a plurality of endpoint devices to determine a network traffic signature for a first application, wherein the network traffic signature for the first application comprises a set of flows within a time window;
monitoring the network traffic data to determine a network traffic signature for a second application, wherein the network traffic signature for the second application comprises the network traffic signature of the first application plus a flow to an additional address that is not included in the set of flows of the network traffic signature of the first application;
determining a ratio of endpoint devices having network traffic data that matches the network traffic signature for the second application as compared to a percentage of endpoint devices having network traffic data that matches the network traffic signature for the first application; and
determining that the second application is the altered application comprising an altered version of the first application when the percentage satisfies a threshold.

* * * * *